United States Patent [19]

Ward

[11] Patent Number: 5,228,979
[45] Date of Patent: Jul. 20, 1993

[54] HYDROCRACKING WITH A CATALYST CONTAINING A NOBLE METAL AND ZEOLITE BETA

[75] Inventor: John W. Ward, Yorba Linda, Calif.

[73] Assignee: Union Oil Company of California, Los Angeles, Calif.

[21] Appl. No.: 803,141

[22] Filed: Dec. 5, 1991

[51] Int. Cl.$^5$ .................. C10G 65/10; C10G 47/02
[52] U.S. Cl. ........................ 208/111; 208/58; 208/59; 208/89
[58] Field of Search .................. 208/58, 89, 111

[56] References Cited

U.S. PATENT DOCUMENTS

| | | | |
|---|---|---|---|
| Re. 28,341 | 2/1975 | Wadlinger et al. | 208/120 |
| 3,256,177 | 6/1966 | Tulleners et al. | 208/89 |
| 3,456,177 | 10/1969 | Carson | 208/89 |
| 3,655,551 | 4/1972 | Hass et al. | 208/58 |
| 3,702,818 | 11/1972 | Streed | 208/89 |
| 3,761,395 | 9/1973 | Child et al. | 208/89 |
| 3,923,641 | 12/1975 | Morrison . | |
| 3,929,672 | 12/1975 | Ward | 252/455 Z |
| 4,294,687 | 10/1981 | Pinaire | 208/58 |
| 4,302,323 | 11/1981 | Chen | 208/89 |
| 4,368,113 | 1/1983 | Winter et al. | 208/89 |
| 4,451,354 | 5/1984 | Stuntz | 208/89 |
| 4,486,296 | 12/1984 | Oleck et al. | 208/111 |
| 4,576,710 | 3/1986 | Nongbri et al. | 208/55 |
| 4,601,993 | 7/1986 | Chu et al. | 208/111 |
| 4,612,108 | 9/1986 | Angevine et al. | 208/111 |
| 4,615,997 | 10/1986 | Chen et al. | 562/66 |
| 4,676,887 | 6/1987 | Fischer et al. | 208/61 |
| 4,740,292 | 4/1988 | Chen et al. | 208/111 |
| 4,756,822 | 7/1988 | Chen et al. | 208/111 |
| 4,812,223 | 3/1989 | Hickey, Jr. et al. | 208/111 |
| 4,816,538 | 3/1989 | Abdo | 502/66 |
| 4,837,396 | 6/1989 | Herbst et al. | 502/68 |
| 4,844,790 | 7/1989 | Occelli | 208/110 |
| 4,857,169 | 8/1989 | Abdo | 208/111 |
| 4,867,861 | 9/1989 | Abdo et al. | 208/27 |
| 4,891,458 | 1/1990 | Innes et al. | 585/323 |
| 4,911,823 | 3/1990 | Chen et al. | 208/120 |
| 4,954,241 | 9/1990 | Kukes et al. | 208/89 |
| 4,983,273 | 1/1991 | Kennedy et al. | 208/89 |
| 4,985,384 | 1/1991 | Gilson | 502/61 |

FOREIGN PATENT DOCUMENTS 0243629 11/1987 European Pat. Off. .
WO9100851 1/1991 PCT Int'l Appl. .

*Primary Examiner*—Helane Myers
*Attorney, Agent, or Firm*—Yale S. Finkle; Gregory F. Wirzbicki

[57] ABSTRACT

A process for hydrocracking various types of hydrocarbon feedstocks in an ammonia-rich environment using a catalyst comprising zeolite Beta and a noble metal hydrogenation component, preferably palladium.

20 Claims, No Drawings

HYDROCRACKING WITH A CATALYST CONTAINING A NOBLE METAL AND ZEOLITE BETA

BACKGROUND OF THE INVENTION

The invention relates to a hydrocracking process and is particularly concerned with the use of a hydrocracking catalyst containing a noble metal hydrogenation component and zeolite Beta to produce gasoline and/or middle distillates from feedstocks having a major proportion of components boiling above 500° F.

Petroleum refiners often produce desirable products, such as gasoline and turbine fuel, by catalytically hydrocracking high boiling hydrocarbons into product hydrocarbons of lower average molecular weight and boiling point. Hydrocracking is generally accomplished by contacting, in an appropriate reactor vessel, a gas oil or other hydrocarbon feedstock with a suitable hydrocracking catalyst under appropriate conditions, including an elevated temperature and an elevated pressure and the presence of hydrogen, such that a hydrocarbon product is obtained containing a substantial portion of a desired product boiling in a specified range, as for example, a heavy gasoline boiling in the range of approximately 185° to 420° F.

Oftentimes, hydrocracking is performed in conjunction with hydrotreating, usually by a method referred to as "integral operation." In this process, the hydrocarbon feedstock, usually a gas oil containing a substantial proportion of components boiling above a desired end point, as for example, 420° F. in the case of certain gasolines, is introduced into a catalytic hydrotreating zone wherein, in the presence of a suitable catalyst, such as a zeolite- or sieve-free, particulate catalyst comprising a Group VIII metal component and a Group VIB metal component on an amorphous, porous, inorganic, refractory oxide support most often composed of alumina, and under suitable conditions, including an elevated temperature (e.g., 400° to 1000° F.) and an elevated pressure (e.g., 100 to 5000 p.s.i.g.) and with hydrogen as a reactant, the organonitrogen components and the organosulfur components contained in the feedstock are converted to ammonia and hydrogen sulfide, respectively. Subsequently, the entire effluent removed from the hydrotreating zone is treated in a hydrocracking zone maintained under suitable conditions of elevated temperature, pressure, and hydrogen partial pressure, and containing a suitable hydrocracking catalyst, such that a substantial conversion of high boiling feed components to product components boiling below the desired end point is obtained. Usually, the hydrotreating and hydrocracking zones in integral operation are maintained in separate reactor vessels, but, on occasion, it may be advantageous to employ a single, downflow reactor vessel containing one or more upper beds of hydrotreating catalyst particles and one or more lower beds of hydrocracking particles. Examples of integral operation may be found in U.S. Pat. Nos. 3,132,087, 3,159,564, 3,655,551, and 4,040,944, all of which are herein incorporated by reference in their entireties.

In some integral operation refining processes, and especially those designed to produce gasoline from the heavier gas oils, a relatively high proportion of the product hydrocarbons obtained from integral operation will have a boiling point above the desired end point. For example, in the production of a gasoline product boiling in the $C_4$ to 420° F. range from a gas oil boiling entirely above 570° F., it may often be the case that as much as 30 to 60 percent by volume of the products obtained from integral operation boil above 420° F. If it is desired to convert these high boiling components to hydrocarbon components boiling below 420° F., the petroleum refiner separates the 420° F.+ high boiling components from the other products obtained in integral operation, usually after first removing ammonia by a water washing operation, a hydrogen-containing recycle gas by high pressure separation, and an $H_2S$-containing, $C_1$ to $C_3$ low BTU gas by low pressure separation. This 420° F.+ boiling bottom fraction is then subjected t further hydrocracking, either by recycle to the hydrotreating or hydrocracking reactor in single stage operation or by introduction into a second hydrocracking zone wherein yet more conversion to the desired $C_4$ to 420° F. product takes place.

In the foregoing two stage process, the two hydrocracking reaction zones often contain hydrocracking catalysts of the same composition. One catalyst suitable for such use is disclosed as Catalyst A in Example 16 of U.S. Pat. Nos. 3,897,327 and 3,929,672, both of which are herein incorporated by reference in their entireties, which catalyst is comprised of a palladium-exchanged, steam-stabilized Y zeolite hydrocracking component. Although the catalysts used in the two hydrocracking reaction zones may have the same composition and the same catalytic properties, the hydrocracking conditions required in the second hydrocracking reaction zone are less severe than those required in the first. The reason for this is that ammonia is not present in the second hydrocracking reaction zone (due to water washing) whereas a significant amount of ammonia is present in the first hydrocracking zone. To account for the difference in operating conditions, it is believed that ammonia neutralizes or otherwise interferes with the acidity of the zeolite in the catalyst of the first reaction zone, thereby forcing the refiner to employ relatively severe conditions for operation, as for example, increased temperature. On the other hand, in the ammonia-deficient atmosphere of the second hydrocracking reaction zone, high conversions to the desired product are obtainable under relatively moderate conditions, often with an operating temperature about 100° to 210° F. lower than that required in the first hydrocracking reaction zone.

Further description of two-stage hydrocracking operations may be found in U.S. Pat. Nos. 4,429,053 and 4,857,169 herein incorporated by reference in their entireties, which patents provide process flow sheets for typical two-stage hydrocracking processes.

Although there exist several types of commercial hydrocracking catalysts which can be used effectively in single stage hydrocracking or in either the first, second or both stages of the above-discussed two-stage hydrocracking process, there is always a demand for new catalysts with superior overall activity, selectivity and stability for producing gasoline and/or other products via hydrocracking.

SUMMARY OF THE INVENTION

In accordance with the invention, it has now been surprisingly found that catalysts containing a noble metal hydrogenation component and zeolite Beta are more active than other zeolite-based noble metal catalysts for hydrocracking in an ammonia-rich environment but less active in an ammonia-deficient environment. Accordingly, the invention is directed to a process for hydrocracking a hydrocarbon feedstock, preferably a feedstock having an initial boiling point between about 500° F. and 650° F., to produce gasoline and/or middle distillates, such as diesel fuel and turbine fuel, by contacting the feedstock under hydrocracking conditions with a catalyst comprising a noble metal component, preferably a palladium or platinum component, and zeolite Beta in the presence of a ga phase containing hydrogen and greater than about 200 ppmv ammonia, preferably greater than about 1,000 ppmv ammonia.

Preliminary tests indicate that a noble metal-exchanged zeolite Beta catalyst, when used to produce gasoline via hydrocracking, has a significantly higher activity for producing gasoline in first stage (in the presence of $NH_3$) hydrocracking as compared to a zeolite-based, noble metal-exchanged catalyst now commercially available for use in hydrocracking processes to selectively produce gasoline. Thus, the process of the invention is a significant improvement in the art of hydrocracking.

DETAILED DESCRIPTION OF THE INVENTION

The present invention is directed to a hydrocracking process carried out in the presence of ammonia and hydrogen utilizing a hydrocracking catalyst comprising a noble metal hydrogenation component(s) on a support comprising zeolite Beta.

Zeolite Beta is a crystalline zeolite whose composition and X-ray powder diffraction analysis are disclosed in U.S. Pat. No. Re. 28,341, herein incorporated by reference in its entirety. This zeolite is a large pore zeolite having a pore size above 7.0 angstroms and a Constraint Index below 2, preferably between 0.6 and 1.0. The Constraint Index of a zeolite is a convenient measure of the extent to which a zeolite provides access to molecules of varying sizes to its internal structure. Zeolites which provide a highly restricted access to and egress from its internal structure have a high value for the Constraint Index, and zeolites of this kind usually have pores of small size. On the other hand, zeolites which provide relatively free access to the internal zeolite structure have a low value for the Constraint Index. The method by which Constraint Index is determined is described fully in U.S. Pat. No. 4,0167,218, the disclosure of which is herein incorporated by reference in its entirety.

Zeolite Beta is prepared, in general, as a boron-free aluminosilicate zeolite having a silica-to-alumina mole ratio ($SiO_2:Al_2O_3$) of at least 10 up to about 100, but preferably no more than about 40, and most preferably in the range of 20 to 30. It may also be prepared by direct synthesis or subsequent treatment of a previously synthesized zeolite Beta in yet higher silica-to-alumina mole ratios, e.g., 500:1 or more, and although such materials may have little or no zeolitic properties, it is to be understood that, in the present invention, the term "zeolite Beta" is meant to encompass such materials. The preferred zeolite Betas have a crystal size of about 0.1 to 0.7 micron, a surface area of about 400 to 800, preferably 650 to 750, and most preferably 700 to 750 $m^2/gm$, a cyclohexane adsorption capacity of about 15 to 25 g/100 g, and a water vapor sorptive capacity at 25° C. and a $p/p_o$ value of 0.10 of greater than 5 weight percent, typically greater than about 10 weight percent. As used herein "$p/p_o$" represents the water vapor partial pressure to which the zeolite Beta is exposed divided by the water vapor partial pressure at 25° C.

As initially prepared, zeolite Beta is usually in the alkali metal form and contains an organic templating agent. In this form, the zeolite has little if any catalytic activity for promoting acid catalyzed conversion reactions, e.g., cracking reactions. Accordingly, the zeolite is generally converted to more active forms by calcination to decompose and drive off the templating agent, followed by base exchange with ammonium cations to substantially reduce the alkali metal content, followed by another calcination to convert the ammonium-exchanged zeolite to the hydrogen form. For zeolite Betas initially prepared in the sodium form, the preferred sodium content upon conversion to an active form is below 1.0 percent by anhydrous weight, calculated as $Na_2O$, preferably below about 0.5 percent by anhydrous weight and more preferably below about 0.05 percent by anhydrous weight. If desired, the alkali metal content of the zeolite Beta may be also be reduced, after calcination to decompose and drive off the templating agent, by treatment with a dilute acid such as dilute nitric acid.

Publications which further discuss the properties of zeolite Beta include U.S. Pat. Nos. 3,923,641, 4,676,887, 4,812,223, 4,486,296, 4,601,993, and 4,612,108, all of which are herein incorporated by reference in their entireties.

At present, it is preferred that the hydrocracking catalyst support contain, except for the possible presence of one or more, amorphous, inorganic refractory oxide components, only zeolite Beta. Preferably, the catalyst and catalyst support is devoid of any clays including pillared clays, delaminated clays and layered magnesium silicates and other types of zeolites (zeolitic molecular sieve) or nonzeolitic crystalline molecular sieves, including those zeolites and nonzeolitic sieves having pores of intermediate or small size, i.e., below 7.0 angstroms, which are not defined by 12-membered rings of oxygen atoms, and sieves having a large pore size such as rare earth-exchanged Y zeolites, ultrastable Y zeolites, such as Z-14US zeolite, ZSM-4 zeolite, ZSM-18 zeolite and ZSM-20 zeolite. However, in alternative but non-preferred embodiments of the invention, clays, other zeolites or nonzeolitic molecular sieves may also be present. The term "molecular sieve" as used herein refers to any material capable of separating atoms or molecules based on their respective dimensions. Molecular sieves include zeolites, microporous carbons, porous membranes, aluminas and the like. The term "pore size" as used herein refers to the diameter of the largest molecule that can be sorbed by the particular molecular sieve in question. The measurement of such diameters and pore sizes is discussed more fully in Chapter 8 of the book entitled *Zeolite Molecular Sieves* written by D. W. Breck and published by John Wiley & Sons in 1974, the disclosure of which book is hereby incorporated by reference in its entirety. The term "nonzeolitic" as used herein refers to crystalline molecular sieves whose frameworks are not formed of substantially only silicon and aluminum atoms in tetrahedral coordination with oxygen atoms. "Zeolitic" molecular sieves are distinguished from nonzeolitic molecular sieves in that their frameworks are formed of substantially only silicon and aluminum atoms in tetrahedral coordination with oxygen atoms, such as the frameworks present in ZSM-5 zeolites, Y zeolites and X zeolites.

In a preferred embodiment of the invention, the zeolite Beta is present in the catalyst support with an amorphous, porous, inorganic refractory oxide component which serves as a binder. Preferably, the support is made by combining the zeolite Beta with one or more precursor materials, such as peptized alumina, alumina hydrogels, silica-alumina hydrogels, silica sols and the like, which upon calcination yield the desired amorphous, inorganic refractory oxide(s), for example, alumina, silica alumina, magnesia, silica-magnesia as well as combinations of such materials. Typically, the mixture of zeolite Beta and precursor material is comulled and then extruded through a die having small openings therein of desired cross-sectional size and shape, e.g., a circle, a trilobal cloverleaf, a quadrolobal cloverleaf, etc. The extruded matter is then broken into appropriate lengths, e.g., $\frac{1}{8}$ to $\frac{3}{4}$ inch, dried, and calcined in steam-free air at a temperature, usually between about 800° and 1,100° F. to produce a material suitable for use as the hydrocracking catalyst support. At present it is preferred that the catalyst support be produced in cylindrical form; however, as stated above, other cross-sectional shapes are possible, such as cloverleafs of polylobal design, for example, trilobal or quadrolobal shapes, as shown, for example, in FIGS. 8 and 10, respectively, in U.S. Pat. No. 4,028,227 herein incorporated by reference in its entirety.

In the foregoing description the amorphous, inorganic refractory oxide component is used as a binder material to hold the zeolite Beta together in the support. It will be understood that components other than the binder material can also be incorporated into the comulled mixture, including, for example, amorphous, inorganic refractory oxide diluents which may or may not possess some type of catalytic activity. Examples of such diluents include clays, alumina, silica-alumina, silica-magnesia, and a heterogeneous dispersion of finely divided silica-alumina particles in an alumina matrix, which dispersion is described in detail in U.S. Pat. Nos. 4,097,365 and 4,419,271, the disclosures of which are herein incorporated by reference in their entireties. Additionally and alternatively, hydrogenation component precursors can also be comulled into the mixture, as will be discussed in more detail hereinafter.

It will be further understood that producing the catalyst and catalyst support in extrudate form, while certainly the most highly preferred method, is still but one option available to those skilled in the art. The catalyst and its support may also be produced in tablets, granules, spheres, and pellets, as desired, by any known method for combining zeolites with an amorphous, porous, inorganic refractory oxide component. For purposes herein, the term "support" is defined as all materials in the catalyst except the hydrogenation metal component(s).

In addition to the above-described support, the hydrocracking catalyst also contains one or more hydrogenation components containing a noble metal, preferably a Group VIII noble metal, such components typically being in the form of the free metals or their respective oxides and sulfides, the former being most preferred. The Group VIII noble metals which can be used include platinum, palladium, rhodium, iridium, and ruthenium. Although hydrogenation components containing any of these noble metals may be used, those containing platinum or palladium are preferred with those containing palladium in the form of the free metal being most preferred. Thus, the most highly preferred hydrocracking catalyst contains palladium and no other noble or non-noble metals.

The hydrogenation component(s) may be incorporated into the catalyst in any of many ways known in the art for combining hydrogenation component(s) with supports containing zeolites. One such method, and the preferred procedure, is to ion exchange the Group VIII noble metal component directly into the zeolite Beta prior to combining the zeolite with the amorphous, inorganic, refractory oxide binder. The ion exchange is typically accomplished by contacting the zeolite Beta with an aqueous solution of the desired noble metal in cationic form. Ammonium ions are usually also introduced into the aqueous solution, normally in the form of ammonium hydroxide, to produce the cation amine complex of the noble metal. The ion exchange is normally carried out such that at least 0.1 weight percent, preferably between about 0.1 and about 5.0 weight percent noble metal, calculated as the metal, is incorporated into the zeolite. Another method of incorporating the hydrogenation component(s) into the catalyst support is to first prepare the support, for example, as an extrudate, containing zeolite Beta and, optionally, an amorphous inorganic refractory oxide in calcined form, and then impregnate the support with solutions containing the desired metal(s) in dissolved form. Calcination in air, typically in the absence of added steam, at an elevated temperature, usually between about 600° and 1,100° F., preferably between about 800° and 1,100° F., produces the desired catalyst containing metals in oxide form. Likewise, and in another embodiment, the desired metal(s) are introduced by comulling a compound containing such metal(s) in the zeolite Beta-inorganic refractory oxide precursor mixture previously described, followed by shaping (e.g., extrusion through a die), drying, and calcining in the substantial absence of steam, e.g., at a temperature between about 800° F. and 1000° F., to produce the oxide form of the catalyst.

In some instances, it may be desirable prior to incorporating the noble metal component into the catalyst, to increase the stability and/or acidity of the zeolite Beta by exchanging the zeolite with polyvalent metal cations, such as rare earth-containing cations, magnesium cations, calcium cations and the like. However, in preferred embodiments of the invention, the zeolite Beta is substantially free of rare earth cations.

By the foregoing procedures or their equivalents, catalysts with the hydrogenation metal(s) present in the oxide form are prepared as particulates, with the majority of such particles, usually at least 90 weight percent, and preferably substantially all, individually containing zeolite Beta and an amorphous, inorganic refractory oxide in a support for the hydrogenation component. The finished hydrocracking catalyst, when used to selectively produce gasoline, will typically comprise (1) between about 10 and 90 weight percent zeolite Beta, preferably between about 40 and 85 weight percent, and usually above about 70 weight percent, (2) between about 5 and 50 weight percent amorphous, inorganic refractory oxide binder, preferably between about 10 and 30 weight percent, and (3) between about 0.10 and 1.5 weight percent Group VIII noble metal hydrogenation component, calculated as the metal, preferably between about 0.45 and 0.95 eight percent. When used to selectively produce middle distillates, the hydrocracking catalyst will normally contain the same amount of binder and Group VIII noble metal hydrogenation component(s) as set forth above but will generally contain an amorphous, inorganic refractory oxide diluent, e.g., alumina or a dispersion of silica-alumina in an alumina matrix, in lieu of a portion of the zeolite Beta. Thus, the catalyst will typically contain between about 2 and 25 weight percent zeolite Beta, preferably 5 to 15 weight percent, in addition to 40 to 80 weight percent of an amorphous, inorganic, refractory oxide diluent, preferably about 40 to 70 weight percent.

Catalysts prepared as described above will contain the noble metal hydrogenation component(s) in the oxide form. Before use, these catalysts are normally treated to reduce the noble metal components to their active metal form by contacting the catalyst at an elevated temperature, e.g., 300° to 700° F., with hydrogen gas. However, these catalysts are not normally steamed or treated with chlorine gas prior to use.

It has been unexpectedly found that, when catalysts as described above are used to hydrocrack hydrocarbon feedstocks in the presence of a gas phase which contains both hydrogen and ammonia, the activity of the catalyst is much higher than the activity of zeolite-based noble metal catalysts that contain a zeolite other than zeolite Beta. This discovery is particularly surprising in light of the further finding that the zeolite Beta-containing catalyst appears to be less active than other zeolite-based noble metal catalysts when used for hydrocracking in the ammonia-free environments typically encountered in second stage hydrocracking. Thus, in accordance with the process of the invention, the noble metal-zeolite Beta catalysts described above are typically used in first or single stage hydrocracking operation where ammonia is present in the gas phase in concentrations above about 200 ppmv, usually above 1000 ppmv, normally because of the conversion of nitrogen components into ammonia during hydrotreating of a feedstock containing organonitrogen components in a hydrotreating zone upstream of the first or single stage hydrocracking zone as is the case in a typical integal hydrotreating-hydrocracking operation. In such operations, the concentration of ammonia in the first or single stage hydrocracking zone is dependent on the nitrogen concentration of the feedstock fed to the hydrotreating zone and the hydrotreating conditions employed therein. Thus, the concentration of ammonia in the gas phase in the hydrocracking zone may range as high as 10,000 ppmv. However, typical feedstocks to the hydrotreating zone yield concentrations of ammonia in the hydrocracking zone gas phase which range between about 750 and 3,500 ppmv.

Noble metal zeolite Beta hydrocracking catalysts can be used in accordance with the invention to convert a wide variety of hydrocarbon feedstocks to a hydrocarbon product of lower average boiling point and/or molecular weight. The feedstocks that may be subjected to hydrocracking by the method of the invention include all mineral oils and synthetic oils (e.g., shale oil, tar sand products, etc.) and fractions thereof. Illustrative feedstocks include atmospheric gas oils, vacuum gas oils, coker gas oils, and catcracker distillates. The typical hydrocracking feedstock, however, contains a substantial proportion of components, usually at least 50 percent by volume, often at least 75 percent by volume, boiling above the desired end point of the product, which end point, in the case of gasoline, will generally be in the range of about 380° to 420° F., and in the case of middle distillates, will typically be in the range of 650° to 700° F. Thus, the feedstock will normally not be a naphtha which contains a substantial amount of components boiling below 380° F. Usually, the feedstock is not substantially dealkylated, will contain greater than about 50 volume percent components boiling above 500° F., and quite often will be a gas oil or other feedstream which boils entirely above 570° F. Highly useful results are achievable with feeds containing at least 30 percent by volume of components boiling between 600° and 1100° F. Typically, the feedstocks will be substantially free of straight and branched chain hydrocarbons containing between 1 and 10 carbon atoms.

For best results in hydrocracking, the catalyst will be employed as a fixed bed of catalytic particulates, which bed has a relatively uniform concentration of zeolite Beta throughout, in a hydrocracking reactor vessel into which hydrogen, ammonia and the feedstock are introduced and passed in a downwardly direction. Operating conditions in the reactor vessel are chosen so as to convert the feedstock into the desired product, which, in one preferred embodiment, is a hydrocarbon product containing a substantial proportion of gasoline components boiling, for example, in the 50° to 420° F. range. However, other products, such as middle distillates boiling in the 300° to 700° F range, may also be desired on occasion, and conditions must be adjusted according to the product (or distribution of products) desired. The exact conditions required in a given situation will depend upon the nature of the feedstock, the particular catalyst composition utilized, and the desired product(s). In general, the conditions of operation for hydrocracking will fall into the following usual and preferred ranges:

TABLE I

| Conditions | Usual | Preferred |
|---|---|---|
| Temperature, °F. | 450–850 | 500–800 |
| °C. | 232–454 | 260–427 |
| Pressure, psig | 750–3500 | 1000–3000 |
| atm | 51–238 | 68–204 |
| LHSV, reciprocal hours | 0.3–5.0 | 0.5–3.0 |
| H$_2$/Feedstock, MSCF/bbl as measured at 60° F. (15.6° C.) and 1 atmosphere | 1–10 | 2–8 |

The foregoing Table I shows the suitable and preferred hydrocracking conditions for single stage or for each stage of a two stage operation (the latter being described more fully in U.S. Pat. No. 4,429,053). It will be understood, however, that the operating conditions in the two stages of the two stage process are not necessarily identical. In fact, as mentioned hereinbefore, the primary difference in conditions in the two hydrocracking reactor vessels of two stage operation is the presence of substantial ammonia, usually greater than about 200 ppmv or higher in the first stage, and its essential absence, i.e. less than about 50 ppmv, in the second, allowing for less severe conditions in the second stage. There may, however, be yet other differences in conditions in any particular situation.

Based on presently available data, a noble metal-exchanged, zeolite Beta catalyst as compared to a commercial noble metal gasoline hydrocracking catalyst containing a single steam stabilized Y zeolite provides for much higher activity in the first stage of the two-stage process. This achievement, and others, is proven in the following example, which is provided for illustrative purposes and not to limit the invention as defined by the claims.

EXAMPLE Catalyst 1

Catalyst 1 was prepared by ion-exchanging a zeolite Beta obtained from the PQ Corporation with palladium. The zeolite Beta had an overall silica-to-alumina mole ratio of about 26 and contained about 0.23 weight percent sodium, calculated as $Na_2O$. The ion exchange was carried out by slurrying the zeolite Beta in a dilute solution of ammonium hydroxide. An ammoniacal solution of palladium tetramine chloride was then added to the slurry dropwise over several hours. After all of the palladium solution was added, the slurry was filtered and dried overnight at 110° C. The resultant palladium-exchanged zeolite Beta was then comulled with 20 weight percent, dry basis, peptized Catapal alumina and the mixture extruded into 1/16 inch diameter cylindrical particles of between ⅛ and ½ inch in length, dried at about 100° C. and calcined at 460° C. in flowing, sieve dried air. The resulting catalyst contained about 0.54 weight percent palladium, calculated as the metal, on a support comprising 80 weight percent zeolite Beta and 20 weight percent alumina.

Catalyst 2

Catalyst 2 was prepared similarly to Catalyst 1 except, before the zeolite Beta was exchanged with palladium, its sodium content was reduced to about 0.039 weight percent, calculated as $Na_2O$, by ion exchanging the zeolite Beta with an ammonium nitrate solution. The resulting catalyst contained palladium in the proportions above specified for Catalyst 1 on a support comprising 80 weight percent zeolite Beta and 20 weight percent alumina.

Catalyst 3

Catalyst 3 is a sample of a commercial gasoline hydrocracking catalyst obtained from UOP. It was prepared similarly to Catalysts 1 and 2 except that LZY-82 zeolite was used in place of zeolite Beta. The LZY-82 zeolite used was a steam-stabilized Y zeolite having a unit cell size of about 24.55 angstroms, a pore size above 7.0 angstroms and an overall silica-to-alumina mole ratio of 6.7. The resulting catalyst contained palladium in the proportions above specified for Catalysts 1 and 2 on a support comprising 80 weight percent LZY-82 zeolite, and 20 weight percent alumina.

Each of the above-described three catalysts was reduced to convert the palladium component to palladium metal by passing hydrogen gas through a bed of the catalyst at a temperature initially of about 300° F. and slowly increased to 700° F. and held at that temperature for about 1 hour.

The three catalysts were compared for hydrocracking activity in both simulated first and second stage testing. Specifically, the three catalysts were separately tested for hydrocracking a hydrotreated, partially hydrocracked vacuum gas oil feed having an API gravity of 38.7° an initial boiling point of 373° F., a final boiling point of 807° F., and a 50 percent boiling point of 568° F., with about 8 volume percent boiling below 400° F., as determined by a modified ASTM D1160 distillation.

Each catalyst was first tested for simulated second stage operation in the absence of ammonia by passing the feedstock through a laboratory size reactor vessel containing about 150 milliliters of the reduced catalyst at a total pressure of 1450 psig, a liquid hourly space velocity (LHSV) of 1.7 reciprocal hours, and a hydrogen feed rate of 8000 scf/bbl as measured at 60° F. In addition, sufficient thiophene was added to the feed to provide a hydrogen sulfide concentration in the gas phase of about 5,000 ppmv and thereby simulate a hydrogen sulfide-containing atmosphere as it exists in commercial second stage hydrocracking reactors. The temperature conditions were adjusted as necessary to maintain a product of 49.5° API gravity, which, by previously established correlations, corresponds to about a 60 volume percent yield of gasoline-type materials boiling below 420° F., over the course of 100 hours. At the end of the 100 hours, the temperature required for each catalyst to maintain the desired product gravity was recorded, and using Catalyst 3 as a reference, the activity of Catalysts 1 and 2 relative to this catalyst, i.e., the activity delta, was calculated. These data are summarized in Table II below.

After the second stage simulation, the conditions in the reactor vessel were altered for first stage simulation under ammonia-rich conditions, in particular, by adding, along with the thiophene, sufficient tert-butyl amine to the feed to provide an ammonia concentration in the gas phase of about 2,000 ppmv and adjusting the temperature to maintain production of a liquid product of 47.0° API gravity, which, by previously established correlations, corresponds to about a 40 percent yield of gasoline-type products boiling below 420° F. Again, after a further 100 hours of operation, the temperature required for each catalyst to maintain the desired product gravity was recorded and the activity deltas of Catalysts 1 and 2 relative to Catalyst 3 were calculated. The data is summarized in the following Table II.

TABLE II

|  | Catalyst Designation: | | |
| --- | --- | --- | --- |
|  | 1 | 2 | 3 |
| Composition, Weight % | | | |
| Zeolite Beta (0.23 wt % Na) | 79.5 | — | — |
| Zeolite Beta (0.039 wt % Na) | — | 79.5 | — |
| LZY-82 zeolite | — | — | 79.5 |
| Alumina | 20.0 | 20.0 | 20.0 |
| Palladium | 0.54 | 0.54 | 0.54 |
| Second Stage | | | |
| Activity, °F. | 557 | 561 | 492 |
| Activity Delta,* °F. | +65 | +69 | 0 |
| First Stage | | | |
| Activity, °F. | 671 | 661 | 694 |
| Activity Delta,* °F. | −23 | −33 | 0 |

*Activity of catalyst minus the activity of the reference catalyst, i.e., Catalyst 3. The more negative the value for activity delta, the more active is the catalyst.

As can be seen from the data in Table II, when zeolite Beta-based Catalysts 1 and 2 were used in second stage hydrocracking i.e., hydrocracking in the absence of ammonia, they were 65° and 69° F., respectively, less active then the commercial catalyst containing LZY-82 zeolite. These results are in sharp contrast to those obtained in simulated first stage hydrocracking in the presence of ammonia. Under such conditions, Catalysts 1 and 2 were 23° and 33° F., respectively, more active than Catalyst 3. Such results are quite surprising and unexpected in light of the activity data from second stage hydrocracking and indicate that noble metal-exchanged, zeolite Beta catalysts are more resistant to nitrogen compounds than noble metal catalysts containing other types of zeolites.

Since the activity of a hydrocracking catalyst approximately doubles for every 30° F. decrease in activity temperature, Catalyst 2 is more than twice as active as Catalyst 3 when used for hydrocracking in the presence of ammonia. This means that Catalyst 2 can be used for hydrocracking a given feedstock under the same operating conditions as Catalyst 3 but at a feed rate that is over twice as high. Alternatively, Catalyst 2 can be used to produce the same conversion as Catalyst 3 at the same feed rate but initially at a temperature 33° F. lower in first stage hydrocracking. This temperature differential represents a significant savings in fuel when using Catalyst 2 as compared to Catalyst 3 under ammonia-rich hydrocracking conditions.

Catalyst 1 differs from Catalyst 2 in that its zeolite Beta contains 0.23 weight percent sodium, calculated as $Na_2O$, compared to 0.039 weight percent in the zeolite Beta of Catalyst 2. This increased concentration of sodium ions accounts for the fact that Catalyst 1 is 10° F. less active than Catalyst 2 (671° F. vs. 661° F.) in first stage hydrocracking. Surprisingly the same trend is not observed under second stage hydrocracking conditions wherein Catalyst 1 has about the same activity as Catalyst 2 (557° F. vs. 561° F.) whose zeolite Beta contains a higher concentration of sodium cations.

Although the invention has been described in conjunction with an example and by reference to the preferred embodiments thereof, it is evident that many alternatives, modifications, and variations will be apparent to those skilled in the art in light of the foregoing description. Accordingly, it is intended in the invention to embrace these and all such alternatives, variations, and modifications as may fall within the spirit and scope of the appended claims.

I claim:

1. A hydrocracking process which comprises contacting a hydrocarbon feedstock with a catalyst comprising a noble metal hydrogenation component and a boron-free zeolite Beta under hydrocracking conditions in a hydrocracking zone in the presence of a gas phase containing hydrogen and greater than about 200 ppmv ammonia, wherein said catalyst is not steamed prior to contact with said hydrocarbon feedstock and has a relatively uniform concentration of boron-free zeolite Beta throughout said hydrocracking zone.

2. The hydrocracking process of claim 1 wherein said catalyst further comprises an amorphous, inorganic, refractory oxide component.

3. The hydrocracking process of claim 1 wherein said catalyst comprises between 40 and 85 weight percent zeolite Beta.

4. The hydrocracking process of claim 1 wherein said gas phase contains more than about 1,000 ppmv ammonia.

5. The hydrocracking process of claim 1 wherein said noble metal hydrogenation component comprises palladium o platinum.

6. The hydrocracking process of claim 5 wherein said noble metal hydrogenation component comprises palladium and said gas phase contains between about 750 and 3,500 ppmv ammonia.

7. The hydrocracking process of claim 1 wherein said catalyst comprises between 0.10 and 1.5 weight percent noble metal hydrogenation component, calculated as the metal.

8. A hydrocracking process which comprises:
(a) contacting in a first hydrocracking zone a hydrocarbon feedstock with a catalyst under conditions of elevated temperature and pressure and in the presence of a gas phase containing hydrogen and between about 750 and 10,000 ppmv ammonia so as to produce a product of lower average boiling point, said catalyst comprising a noble metal hydrogenation component in combination with a support comprising (1) a boron-free zeolite Beta in a form catalytically active for cracking hydrocarbons and (2) at least one amorphous, inorganic refractory oxide component;
(b) separating said product of lower average boiling point into a higher boiling fraction and a lower boiling fraction, and
(c) contacting said higher boiling fraction with a catalyst devoid of zeolite Beta in a second hydrocracking zone under hydrocracking conditions in the presence of a gas phase containing hydrogen but no more than about 50 ppmv ammonia.

9. The hydrocracking process of claim 8 wherein said support comprises an amorphous, inorganic, refractory oxide binder.

10. The hydrocracking process of claim 9 wherein said support further comprises an amorphous, inorganic refractory oxide diluent.

11. The hydrocracking process of claim 10 wherein said inorganic refractory oxide diluent comprises a dispersion of silica-alumina particles in alumina.

12. The hydrocracking process of claim 8 wherein said noble metal hydrogenation component comprises palladium or platinum.

13. The hydrocracking process of claim 9 wherein the gas phase in said first hydrocracking zone contains between about 1,000 ppmv and 3,500 ppmv ammonia.

14. The hydrocracking process of claim 13 wherein said hydrogenation component comprises palladium and said inorganic refractory oxide binder comprises alumina.

15. The hydrocracking process of claim 8 wherein the gas phase in said second hydrocracking zone is essentially free of ammonia.

16. A process for refining a hydrocarbon feedstock containing organonitrogen components which process comprises:
(a) contacting said feedstock in the presence of hydrogen under hydrotreating conditions with a hydrotreating catalyst comprising a Group VIB metal component and a Group VIII metal component such that a substantial proportion of said organonitrogen components is converted to ammonia;
(b) contacting substantially all of the effluent from step (a) in a first hydrocracking zone under hydrocracking conditions with a first hydrocracking catalyst comprising a boron-free zeolite Beta and a noble metal hydrogenation component in the presence of a gas phase containing hydrogen and between about 750 and 10,000 ppmv ammonia to produce a hydrocracking product of substantially lower boiling point;
(c) separating said hydrocracking product into a higher boiling fraction and a lower boiling fraction, and
(d) contacting said higher boiling fraction with a second hydrocracking catalyst devoid of zeolite Beta in a second hydrocracking zone under hydrocracking conditions in the presence of a gas phase containing hydrogen but no more than about 50 ppmv ammonia to convert said higher boiling fraction into lower boiling products.

17. The process of claim 16 wherein the gas phase in said first hydrocracking zone contains between 750 and 3,500 ppmv ammonia and said noble metal hydrogenation component comprises palladium.

18. A hydrocracking process which comprises:

(a) contacting a hydrocarbon feedstock with a catalyst comprising a noble metal hydrogenation component and a boron-free zeolite Beta under hydrocracking conditions in a first hydrocracking zone in the presence of a gas phase containing hydrogen and greater than about 200 ppmv ammonia;

(b) separating the effluent from said first hydrocracking zone into a higher boiling fraction and a lower boiling fraction; and (c) contacting said higher boiling fraction with a catalyst devoid of zeolite Beta under hydrocracking conditions in a second hydrocracking zone in the presence of a gas phase containing hydrogen but no more than about 50 ppmv ammonia.

19. The hydrocracking process of claim 18 wherein the gas phase n sad second hydrocracking zone is essentially free of ammonia.

20. The hydrocracking process of claim 18 wherein the gas phase in said first hydrocracking zone contains between about 750 and 3500 ppmv ammonia, and said noble metal hydrogenation component comprises palladium.

* * * * *

UNITED STATES PATENT AND TRADEMARK OFFICE
CERTIFICATE OF CORRECTION

PATENT NO. : 5,228,979

DATED : July 20, 1993

INVENTOR(S) : John W. Ward

It is certified that error appears in the above-identified patent and that said Letters Patent is hereby corrected as shown below:

Column 11, claim 5, line 52, replace "o" with --or--.

Column 14, claim 19, line 4, replace "n sad" with --in said--.

Signed and Sealed this

Fifth Day of April, 1994

Attest:

BRUCE LEHMAN

Attesting Officer     Commissioner of Patents and Trademarks